No. 895,245. PATENTED AUG. 4, 1908.
C. L. LE DUC & L. GARCHEY.
ELASTIC SUSPENSION FOR VEHICLES.
APPLICATION FILED JUNE 18, 1906.

2 SHEETS—SHEET 2.

Witnesses

Inventors
Claude Leouzon le Duc
Louis Garchey

UNITED STATES PATENT OFFICE.

CLAUDE LÉOUZON LE DUC AND LOUIS GARCHEY, OF PARIS, FRANCE.

ELASTIC SUSPENSION FOR VEHICLES.

No. 895,245.  Specification of Letters Patent.  Patented Aug. 4, 1908.

Application filed June 18, 1906. Serial No. 322,296.

*To all whom it may concern:*

Be it known that we, CLAUDE LÉOUZON LE DUC and LOUIS GARCHEY, both citizens of the French Republic, and residents of Paris, France, have invented certain new and useful Improvements Relating to Elastic Suspension of Vehicles, of which the following is a full and clear specification.

This invention relates to elastic suspension of vehicles and more particularly motorcars and has for its object to provide an improved construction of elastic suspension for vehicles according to which the body of the carriage is free to displace itself on the frame in every direction, the shocks and jars of the axle incident to riding on an uneven road not being transmitted to the body of the carriage.

A characteristic feature of the invention is, that the body of the vehicle is not connected with the frame by any more or less rigid parts and consequently is free to displace itself on the frame in any direction; the object of the invention is not to take the body of the carriage along with the frame with greater or lesser elasticity but on the contrary to leave the body of the carriage absolutely free in simply limiting and weakening any movements which it should execute during riding so as to obtain a riding free from shocks and jars even with wheels which have no pneumatics.

Figure 1:
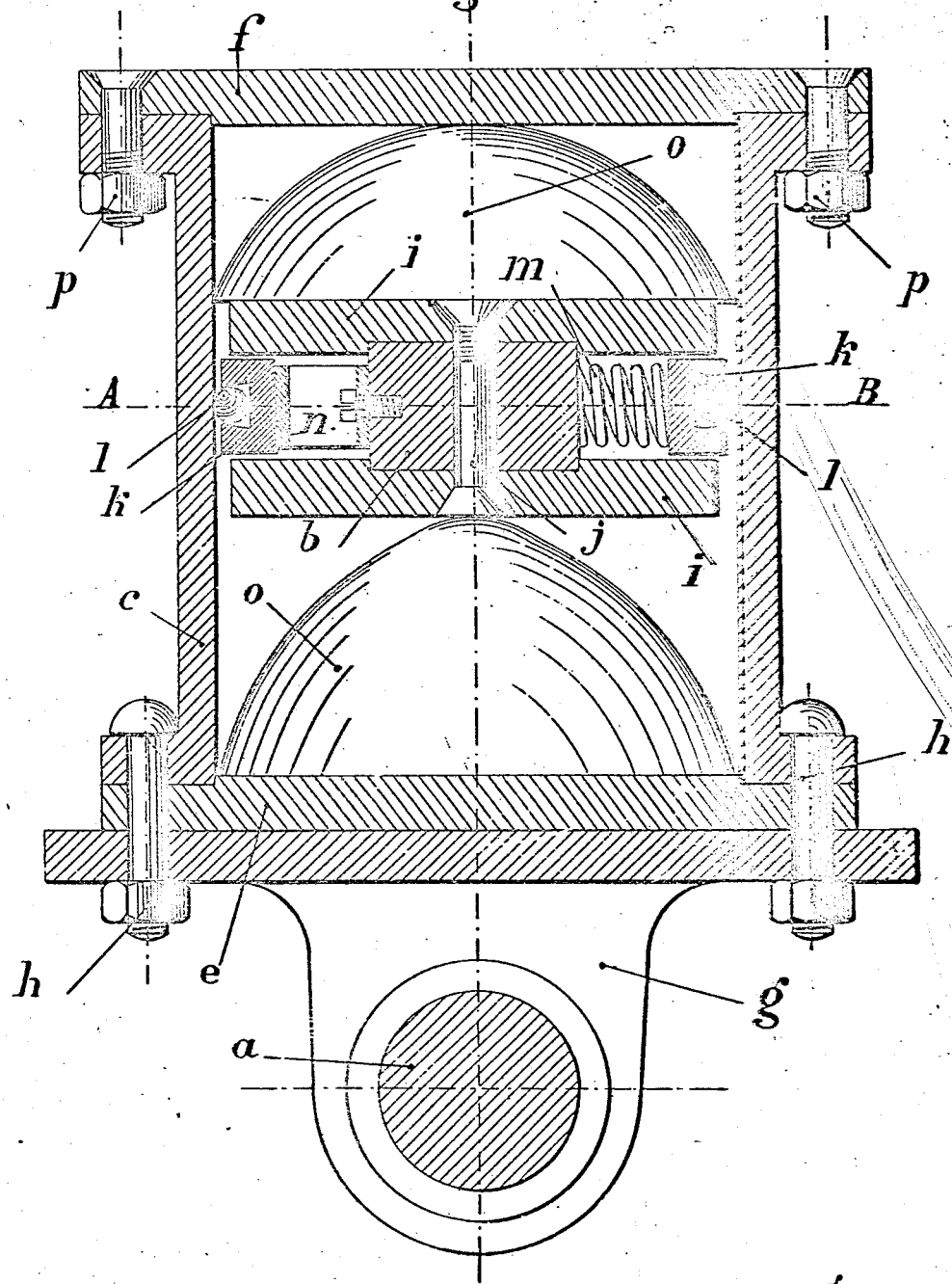
Figure 2:
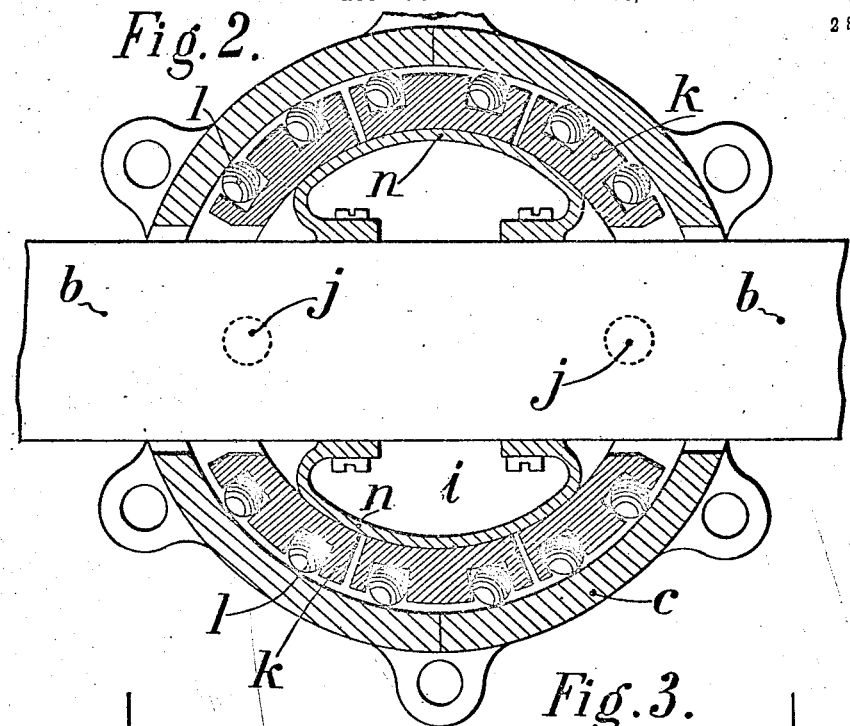
Figure 3:
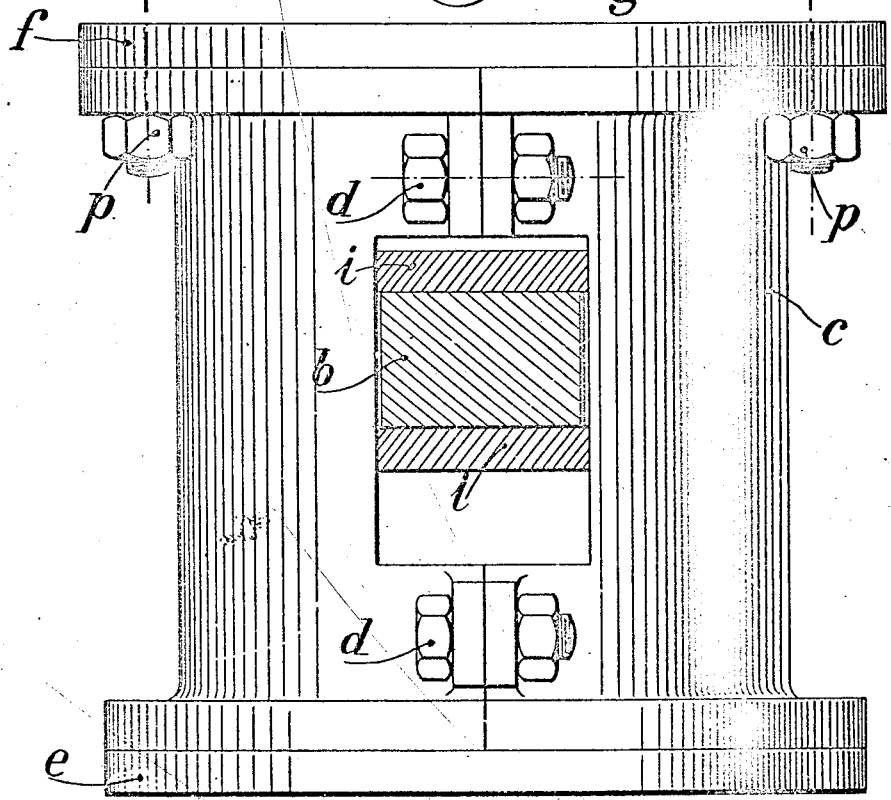

In the accompanying drawings:—Figure 1 is a diametrical section through a buffer-support, vertical to the axle. Fig. 2 represents a section on line A—B of Fig. 1. Fig. 3 is a front view of the buffer-support.

Reference being had to the drawings *a* is the axle, *b* is a cross-bar parallel to the axle and on which the body of the carriage is fixed; this cross-bar *b* passes with certain play through a cylindrical box *c*, which however may be of any suitable cross section. In the drawings the box is shown of cylindrical cross section but it is obvious, that it could as well be square or polygonal. It is further shown in Fig. 3, that this box *c* consists of two parts connected by bolts *d*, it may however be made in one piece or consist of more than two parts. The box is closed at the bottom by a jointed bottom plate *e* and at the upper end by a removable top plate or cover *f*; the box is fixed on axle *a* by a coupling plate *g* attached to the bottom of the box by rivets *h*. The box *c* is thus securely fixed on the axle the cross-bar *b* being rigidly connected with the body of the carriage.

To the upper and lower surfaces of cross-bar *b* plates *i* are fixed by means of screw bolts *j* which correspond in shape to the cross section of box *c* and form with the cross-bar a kind of piston in said box adapted to be displaced in vertical direction. This piston is guided in the box by means of an appropriated number of segments *k* from metal, which are arranged along the periphery of the piston between the two plates *i*. The segments have cavities on their outer surface which serve as bearings for the balls *l*.

The elasticity of the device in horizontal direction is obtained by the insertion of any suitable elastic device between the segments *k* and cross-bar *b*, such as for example an india-rubber ring of solid cross section, an air-tire or the like, or, as shown in the drawings, a strong spiral spring *m* (Fig. 1 right hand side) or blade springs *n* bent according to the shape of the segments and fixed with their ends to the cross-bar *b* (Fig. 1 left hand side and Fig. 2).

The elasticity of the device in vertical direction is obtained by inserting on the one hand between the bottom plate *e* of the box and the piston *b, i, i* and on the other hand between this piston and the cover plate *f* of the box any suitable elastic device such as for example a sphere *o* of india-rubber which may be filled with air under pressure. It is easy to regulate the effect of these buffers *o* by considering the initial compression effected by the screw bolts *w*, which serve for connecting the cover plate with the box; if necessary washers may be inserted to increase the thickness of the cover plate.

It will be easily understood, that through the arrangement described the cross-bar and consequently the body of the carriage are in every sense separated from the axle by elastic devices which permit a distinct movement of the body of the carriage in any direction and weaken the shocks. The size of the boxes *c* will be varied according to the weight to be supported by the cross-bar.

It is obvious that the accessories, for example the means for connecting the box with the axle and for connecting the cross-bar with the body of the carriage may be varied at will and that further any suitable material can be employed. The cross-bar *b* may be placed perpendicular to the axles.

For vehicles drawn by animals the shafts are attached to the front boxes for weakening the shocks produced by the pulling. With the vehicles drawn by animals, such as chaises, landaus, phaetons etc. the front boxes are fixed on the riding-bolster and the hind boxes on the carriage springs or hind cross-beam; the front under-frame of the carriage is connected with the hind under-frame by one or two perches and the body of the carriage does not longer serve for drawing along the hind under-frame whereby it is no longer exposed to the shocks which result from the pulling, the body of the carriage being elastically supported by the boxes hereinbefore described.

What we claim as our invention and desire to secure by Letters Patent is:—

Boxes for the elastic suspension of vehicles which leave the body of the carriage free to displace itself in any direction serving merely to limit and weaken the displacements of the body, comprising in combination a box rigidly connected with the axle, a cross-bar rigidly connected with the body of the carriage, traversing said box, disks fixed to the upper and lower surface of said cross-bar inside the box, segments forming ball bearings, vertically arranged on the periphery of the piston formed by the two disks, balls in said bearings running on the inner surface of the box, elastic means between the segments and the cross-bar and elastic buffers between the upper cross-bar-disk and the top-plate of the box on the one hand and between the lower cross-bar-disk and the bottom-plate of the box, substantially as described and shown and for the purpose set forth.

In witness whereof we have hereunto set our hands in presence of two witnesses.

CLAUDE LÉOUZON LE DUC.
LOUIS GARCHEY.

Witnesses:
ALFRED FREY,
H. C. COXE.